United States Patent [19]

Guarasci et al.

[11] 3,751,719
[45] Aug. 7, 1973

[54] HEAVY CURRENT RELAY CIRCUIT

[75] Inventors: Mario Guarasci, Niagara Falls;
Rodney Hayden, Stoney Creek,
Ontario, both of Canada

[73] Assignee: TRW Inc., Cleveland, Ohio

[22] Filed: Aug. 3, 1972

[21] Appl. No.: 277,695

[30] Foreign Application Priority Data
May 24, 1973 Canada................... 143246

[52] U.S. Cl. ........ 317/148.5 B, 307/10 BP, 317/154
[51] Int. Cl. .......................................... H01h 47/32
[58] Field of Search .................. 317/148.5 B, 154;
307/10 R, 10 BP, 10 LS, 139, 140, 143

[56] References Cited
UNITED STATES PATENTS 3,376,467  4/1968  Ree................................. 317/154
3,284,668  11/1966  Heaslip..................... 317/148.5 B

*Primary Examiner*—James D. Trammell
*Assistant Examiner*—Harry E. Moose, Jr.
*Attorney*—Philip E. Parker, James R. O'Connor et al.

[57] ABSTRACT

The following disclosure describes a heavy current relay switch circuit device for an automobile having a high current load such as a rear window de-icing heater. The device is useful with a manual press type On-Neutral-Off control switch for the heated load, the switch having an On terminal, a Neutral terminal connected to the ignition and an Off terminal. The device has separate On and Off terminals connectable to the corresponding terminals of the switch, a ground terminal, a battery terminal and a load terminal. A silicon controlled rectifier device is connected in series with a relay coil between the Off terminal and ground terminal. The gate of the silicon controlled rectifier is connected to the On terminal so that the rectifier becomes conducting when gated by momentarily pressing the switch to the On position, thus to energize the relay coil. The normally open relay contacts are adapted to connect the battery directly to the load when the relay is energized. If for any reason, such as by vibration, the contacts separate the rectifier continues to conduct current from the ignition circuit through the Off terminal while the ignition is On thus restoring the circuit for the heater load which latter is, however, interrupted should the ignition be turned off.

3 Claims, 3 Drawing Figures

PATENTED AUG 7 1973

3,751,719

HEAVY CURRENT RELAY CIRCUIT

This invention relates to a heavy current relay switch circuit for automotive use.

A rear window heater of an automobile drawing up to 40 amperes or more has been controlled heretofor by a manual toggle switch available to the operator on the dashboard of the automobile which, when actuated, energizes a relay, the relay in turn closing the electrical circuit of the electrical heater for the rear window. Such switch circuitry must be manually turned off whether or not the ignition has been turned off or it will be reactivated when the ignition is again turned on. Thus earlier methods of positively switching a relay in circuit with a window heater load were not regarded as satisfactory as compared with a pressbutton type switch adapted to actuate a relay having a holding circuit electrically associated with the load and releasable by turning off the ignition. The latter type of switch circuit suffers from the disadvantage that mechanical vibration may shake the relay contacts open in which event the holding circuit is opened and the heater circuit cannot be closed unless reactuated by actuation of the manual switch.

It is an object of the present invention to provide a high current relay switch circuit for automobiles actuable by a press "on-off" switch and adapted in the event of mechanical separation of the relay contacts to maintain the energizing of the relay to again close the relay contacts by a holding circuit independent of the load.

It is a further object of the invention to provide a heavy current relay switch circuit for automobiles adapted to be disconnected by opening the ignition circuit of the automobile but which is adapted to connect the load directly with the source of the battery voltage.

Other objects of the invention will be appreciated by a study of the following specification taken in conjunction with the accompanying drawings.

IN THE DRAWINGS

Figure 1:
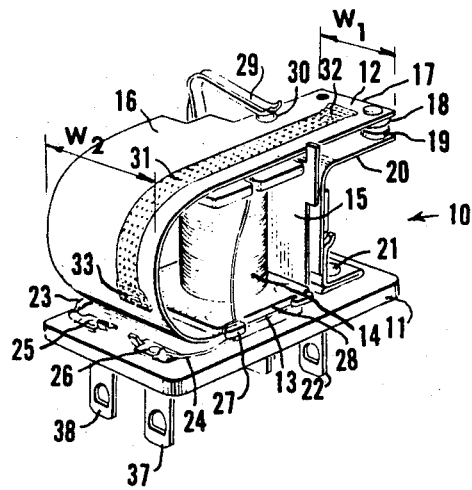
FIG. 1 is a perspective view of the heavy current relay switch device of the invention adapted to be used with a conventional slide type on/off switch.
Figure 2:
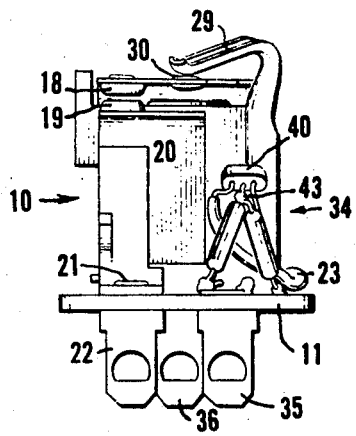
FIG. 2 is an end view of the device of FIG. 1.

In FIGS. 1 and 2 high current relay switch device 10 comprises base 11 formed of an insulating material and carrying a C-shaped relay armature 12 having a base arm 13 fastened to the base between relay coil 14 and the base 11 by core part (not shown) within the coil. The base arm 13 terminates in an upstanding bracket member 15. The free arm portion 16 of the armature terminates at the free contact end 17 carrying normally open contact 18 adapted to articulate with stationary contact 19 carried by contact support bracket 20 upstanding from the base 11 and fastened thereto by a rivet 21 connecting same to terminal post 22. Coil 14 connects by its connecting leads 23, 24 to connecting posts 25, 26 respectively each of said leads being wound about an insulating stud 27 of the winding form flange 28. Limit arm 29 is stamped from the same material as the upstanding stationary bracket member 15 and is engaged by brass stud 30 carried by free arm portion 16 of the armature.

Because of the reduced width W1 of the armature at the free end 17 thereof as compared with the nominal width W2 thereof and thus the effective lesser current conducting sectional area near the contact 18 a shunt member 31 is fastened near contact end 17 as at 32 and extends flexibly by virtue of the same being formed of a flexible metal cloth to a region of greater sectional area to be fastened such as by soldering or welding as at 33 to the arm 16 remote from the base arm 13 of the armature and clear of interference with the connection of winding leads 23, 24 to posts 25, 26. The flexible shunt member 31 in no way restricts the flexing motion of the free arm portion 16 of armature 12 but acts as a current distributor and a heat dissipator. It is not therefore necessary, according to the invention, that it be extended over the entire outer surfaces of the armature about the C-shaped configuration thereof to the base portion 13 but only over such a length thereof proceeding from the free contact end as to provide the desired heat dissipation and current distribution.

Figure 3:
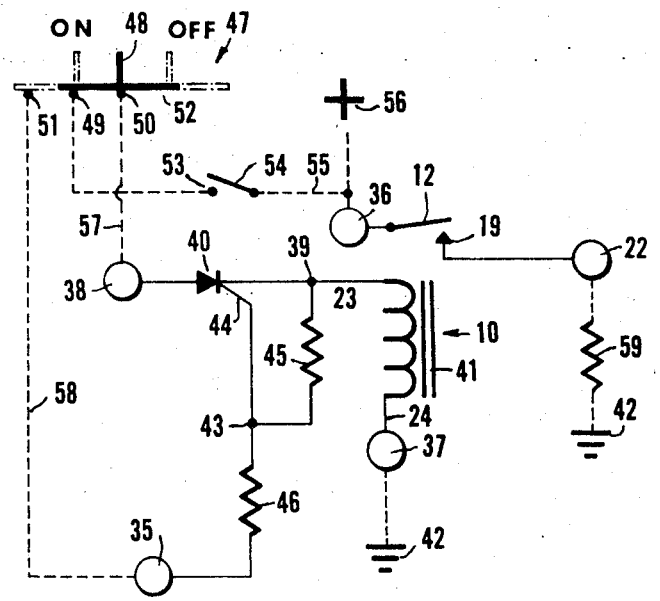
FIG. 3 is a circuit diagram of the device of FIG. 1 in bold lines and indicating in chain lines the connection of the device to automobile circuitry.

The relay circuit components 34 as seen in FIG. 2 are mounted on base 11 in association with terminals 35, 36, 37, 38 and 22. The winding lead 23 proceeds to connecting post 25 as seen in FIG. 1 and additionally to a juncture 39 as seen in FIGS. 2 and 3. In FIG. 3 terminal post 38 connects through solid state silicon controlled rectifier (SCR) 40 to juncture 39 and relay winding 28 adapted to energize relay core 41 by passage of current through line 24 to terminal 37 and chassis ground 42. Juncture 43 connecting to gate 44 of SCR 40 is the juncture point of the two equal resistors 45, 46 extending electrically in series between terminal 35 and juncture 39.

The terminal posts of the device of FIG. 1 are connected to automobile circuitry in the manner indicated in FIG. 3 in chain lines. Thus a conventional three-contact on-neutral-off spring biased manual pressure switch device 47 having a manual actuating arm 48 for moving same from a neutral position connecting contacts 49, 50 to a position connecting said contacts also to contact 51 or to an "Off" position, disconnecting the contact bar 52 thereof from both contacts 49, 51, connects by its intermediate contact 49 to a conventional ignition terminal 53 of ignition switch 54 connecting by line 55 to positive battery source 56, the negative terminal of such source being connected to chassis ground 42. "Off" contact 50 of switch 47 connects by automobile wiring 57 to terminal 38 and "On" contact 51 connects by automobile wiring 58 to terminal 55. Terminal 37 connects to battery source 56 and load terminal 22 is adapted to connect to a rear window heater element 59 connecting in turn to ground 42.

Assuming in the operation of the circuit of FIG. 3 that ignition switch 54 is closed the "On-Off" switch is in the neutral position connecting contact 49, 50 thereof, SCR 40 will be non-conducting in the normal state and relay winding 28 will not be non-conducting in the normal state and relay winding 28 will not be energized. The normally open relay armature 21 will remain open and load 59 will not be energized.

Upon the operator momentarily moving manual switch arm 48, 52 to also energize contact 51, battery voltage will communicate through contact 51 to terminal 55 pulsing gate 54 rendering SCR 40 conducting to energize relay winding 28 thereby closing relay armature 12 to complete the battery circuit to relay contact 19 terminal 22 and load 59. Release of switch 47 from the "On" position to the "Neutral" position shown in bold lines is accomplished by spring force biasing same always to the neutral position whether pushed to the "On" or "Off" direction. The SCR will be in the conducting condition, for once gated by pushing switch 47 momentarily to the "On" position the SCR will remain conducting unless it is grounded or the positive voltage source is removed therefrom. Accordingly while the SCR is in the conducting condition a physical opening of the circuit through the relay armature 12 and contact 19 for the load 59 by physical vibration or other cause will momentarily only interrupt the load circuit, because the relay winding still being energized will again close the relay contacts.

Disconnection of load 59 may be accomplished manually by momentarily actuating the pressure switch 47 to the "Off" position disconnecting contact bar 52 from contact 49 severing the supply of battery voltage to contact 50 thereby resetting the SCR 40 to the non-conducting state and discontinuing current flow in winding 28 thereby releasing armature 12 and disconnecting load 59. Spring recovery of switch 47 to the neutral position shown in bold lines will not allow current to flow from switch contact 49 through switch 47 and SCR 40 because though the contacts 49, 50 are connected, SCR 40 has been rendered non-conducting by momentary removal of the source of voltage therefrom.

If the ignition switch 54 is opened while the circuit of FIG. 3 is in the conducting state and the load is energized SCR 40 becomes immediately non-conducting and the load 59 connected directly to battery source 56 though relay armature 12 is disconnected by opening of the relay.

It will be apparent from the foregoing that the invention concerns a heavy current relay switch circuit device for an automobile having a high current load, an ignition circuit and a press "On-Neutral-Off" control switch having an On terminal, a Neutral ignition terminal and an Off terminal and comprising: an On terminal and an Off terminal connectable to corresponding terminals of said switch; a ground terminal, a battery terminal and a load terminal; a silicon controlled rectifier device having an anode, a base and a gate and a relay coil connected electrically by the anode and base thereof in series between said ground terminal and said Off terminal; a resistor between the gate and base of said rectifier; another resistor connecting said gate to said On terminal and normally open relay contacts closeable upon energizing of said coil. One of said contacts being connected to said battery terminal and the other of said contacts being connected to said load terminal.

We claim as our Invention

1. A heavy current relay switch circuit device for an automobile having a high current load, an ignition circuit and a press "On-Neutral-Off" control switch having an On terminal, a Neutral ignition terminal and an Off terminal and comprising: an On terminal and an Off terminal connectable to corresponding terminals of said switch; a ground terminal, a battery terminal and a load terminal; a silicon controlled rectifier device having an anode, a base and a gate and a relay coil connected electrically by the anode and base thereof in series between said ground terminal and said Off terminal; a resistor between the gate and base of said rectifier; another resistor connecting said gate to said On terminal; normally open relay contacts closeable upon energizing of said coil, one of said contacts being connected to said battery terminal and the other of said contacts being connected to said load terminal.

2. The device of claim 1 in which the relay comprises: a rigid insulated base carrying the terminals of said circuit device, a core and an armature structure mounted on said base, said core carrying said relay coil, said rectifier device and said resistors being connected in said circuit in association with said base.

3. The device of claim 1 and a rigid insulated base having a core part thereon supporting said relay coil; a generally C-shaped resilient metal strip defining an armature adapted to move to close the magnetic circuit of said core upon energizing of said coil; and a flexible metal cloth member extending over a portion of surfaces of said armature to distribute current therein in shunt relationship therewith.

* * * * *

UNITED STATES PATENT OFFICE
CERTIFICATE OF CORRECTION

Patent No. 3,751,719   Dated August 7, 1973

Inventor(s) Mario Guarasci et al.

It is certified that error appears in the above-identified patent and that said Letters Patent are hereby corrected as shown below:

On the cover sheet, [30] "May 24, 1973" should read -- May 24, 1972 --; [57] line 5, "heated" should read -- heater --.

Signed and sealed this 29th day of January 1974.

(SEAL)
Attest:

EDWARD M. FLETCHER, JR.
Attesting Officer

RENE D. TEGTMEYER
Acting Commissioner of Patents